(12) United States Patent
Görg et al.

(10) Patent No.: US 6,910,251 B2
(45) Date of Patent: Jun. 28, 2005

(54) TRANSPORT AND ASSEMBLY DEVICE

(75) Inventors: Alexander Görg, Erkrath (DE); Klaus Kroppa, Bedburg (DE); Rainer Steinberg, Leverkusen (DE)

(73) Assignees: CR Elastomere GmbH, Leverkusen (DE); Ford-Werke AG, Cologne (DE)

( * ) Notice: Subject to any disclaimer, the term of this patent is extended or adjusted under 35 U.S.C. 154(b) by 607 days.

(21) Appl. No.: 10/119,938

(22) Filed: Apr. 11, 2002

(65) Prior Publication Data

US 2002/0180160 A1 Dec. 5, 2002

(30) Foreign Application Priority Data

Apr. 11, 2001 (DE) .......................................... 101 18 122

(51) Int. Cl.[7] .............................. B25B 27/14; F16J 15/32
(52) U.S. Cl. ........................ 29/235; 29/281.1; 29/281.5; 29/450; 29/451; 29/464; 29/888.1; 227/551
(58) Field of Search .......................... 29/235, 238, 244, 29/280, 281.1, 281.5, 282, 450, 451, 888.1, 464, 466; 123/90.17; 277/551

(56) References Cited

U.S. PATENT DOCUMENTS

| | | | |
|---|---|---|---|
| 2,860,535 A | * 11/1958 | Fowler | .......................... 81/8.1 |
| 3,909,916 A | * 10/1975 | Neff et al. | ..................... 29/235 |
| 3,947,944 A | *  4/1976 | Washington | .................. 29/235 |
| 5,013,050 A | *  5/1991 | Curtis | .......................... 29/235 |
| 5,052,695 A | * 10/1991 | Curtis | .......................... 29/235 |
| 5,709,018 A | *  1/1998 | Dugan | .......................... 29/235 |
| 6,065,198 A | *  5/2000 | Vitous et al. | .................. 29/258 |

FOREIGN PATENT DOCUMENTS

DE            41 41 320 C1     6/1993

* cited by examiner

Primary Examiner—Eric Compton
(74) Attorney, Agent, or Firm—Burns Doane Swecker & Mathis, LLP

(57) ABSTRACT

A transport and assembly device for assembling a shaft seal, particularly one with a seal lip directed radially toward the inside, into a camshaft arrangement for an internal combustion engine is designed to simplify the assembly of the shaft seal. The device includes a first intake area for the shaft seal, a second intake area for a signal generator wheel, and an installation area for installation onto the camshaft arrangement during assembly.

20 Claims, 3 Drawing Sheets

TRANSPORT AND ASSEMBLY DEVICE

This application is based on and claims priority under 35 U.S.C. § 119 with respect to German Application No. 101 18 122. 1 filed on Apr. 11, 2001, the entire content of which is incorporated herein by reference.

FIELD OF THE INVENTION

This invention generally relates to the assembly of a shaft seal to a shaft arrangement. More particularly, the invention pertains to a transport and assembly device for assembling a shaft seal, particularly one with a radially inwardly directed seal lip, into a camshaft arrangement for an internal combustion engine.

BACKGROUND OF THE INVENTION

A transport and assembly device for shaft seal O-rings is described in German Patentschrift No. DE 41 41 320 C1. The disclosed assembly is suitable for the transport and assembly of shaft seal O-rings of a general type and in various desired applications.

The assembly of shaft seals into a camshaft arrangement for an internal combustion engine involves particular concerns and potential difficulties. For example, in order to optimally adjust the control times of the camshaft arrangement, both for the input and output valves, adjustment units are used. These adjustment units primarily function on a hydraulic basis and cause relative rotation of the cams toward the belt or gear wheel that drives the camshaft for the chain or the belt, respectively. The adjustment unit is arranged at one end of the camshaft.

An exact control of the opening times of the valves is dependent upon an additional signal generator wheel that is arranged on the camshaft and that is in contact with a sensor that is capable of recording the positions or the rotation speeds. If additional assembly units must be planned in the area of the camshaft arrangement, such as a pump for performing fuel injection, it may become necessary, due to the limited assembly space inside the camshaft housing, to arrange the signal generator wheel at a relatively close distance to the shaft seal, which then seals the inside area of the camshaft housing from the environment. This results in a construction of the adjustment unit, the shaft seal and the signal generator wheel as a compact unit in dimensionally close distances to each other.

However, assembling this type of construction requires a relatively high degree of effort and time. Thus, improvements in this area would be desirable For example, it would be desirable to be able to assemble the necessary components without the same degree of effort and time expenditure associated with known practices.

SUMMARY OF THE INVENTION

A transport and assembly unit is provided for assembling a shaft seal into a camshaft arrangement of an internal combustion engine. The transport and assembly unit makes it possible to assemble both the shaft seal and a signal generator wheel onto the camshaft arrangement (i.e., a camshaft or a camshaft housing) in only one step so that the assembly of both components may occur in a very short time frame and therefore at a relatively low cost.

According to one aspect, a transport and assembly unit for assembling components into a camshaft arrangement for an internal combustion engine includes a transport and assembly device provided with an attachment area for attaching the transport and assembly device to a camshaft arrangement during assembly, a shaft seal positioned in the transport and assembly device, a signal generator wheel positioned in the transport and assembly device, a first intake area provided on the transport and assembly device for intake of the shaft seal, and a second intake area provided on the transport and assembly device for intake of the signal generator wheel.

The transport and assembly device thus possesses two separate intake areas for the two components (i.e., the shaft seal and the signal generator wheel) as well as an installation area that allows the unit as a whole to be relatively exactly positioned with respect to the camshaft arrangement. Both the seal and the signal generator wheel are slid into the camshaft housing or onto the camshaft in one step after the installation of the device equipped with the shaft seal and the signal generator wheel is installed at the camshaft arrangement.

Preferably, the transport and assembly device is designed so that the first intake area represents an external cylindrical section of a collar and the second intake area represents an internal cylindrical section of the collar. Additionally, the first intake area and the second intake area are preferably arranged at an offset to each other in the axial direction of the assembly device.

An especially simple construction of the device is achieved when the first intake area and the second intake area together are designed in cross section as a U-shaped collar component. The transition area of the U-shaped component can have recesses in the form of bores into which an expression tool can be engaged to move or slide the signal generator wheel and the shaft seal off of the assembly device and placed into their final position on the camshaft or in the camshaft housing.

The installation area of the device may include an axial installation surface and/or a radial installation surface for installation of the unit onto the camshaft arrangement. Further, the shaft seal can be equipped with a static sealing element with which the seal is abutted to the first intake area of the assembly device. The seal lip may be located a radial distance to the second intake area in the state in which the shaft seal has been taken in by the transport and assembly device.

Further, a support area for the seal lip of the shaft seal can be provided at a radial offset toward the inside in the first intake area. The exterior cylindrical section of the second intake area, as well as the support area, can be arranged next to one another to form a stepped arrangement. The stability of the transport and assembly device may be increased by providing axially extending reinforcement ribs. Preferably, the transport and assembly device is made of plastic.

In accordance with another aspect, a method of assembling a shaft seal and a signal generator wheel into a camshaft arrangement for an internal combustion engine involves installing an assembly unit to the camshaft arrangement, with the assembly unit including a collar with an open end, a shaft seal positioned in the collar and a signal generator wheel positioned in the collar. The shaft seal and the signal generator wheel are then moved at the same time from the collar into a camshaft arrangement for an internal combustion engine by way of the open end of the collar to assemble the shaft seal and the signal generator wheel to the camshaft arrangement.

BRIEF DESCRIPTION OF THE DRAWING FIGURES

The foregoing and additional features and characteristics of the present invention will become more apparent from the FIG. 1 is a partial cross-sectional view of a transport and assembly device attached to the end area of a camshaft arrangement.

DETAILED DESCRIPTION OF THE INVENTION

Figure 1:
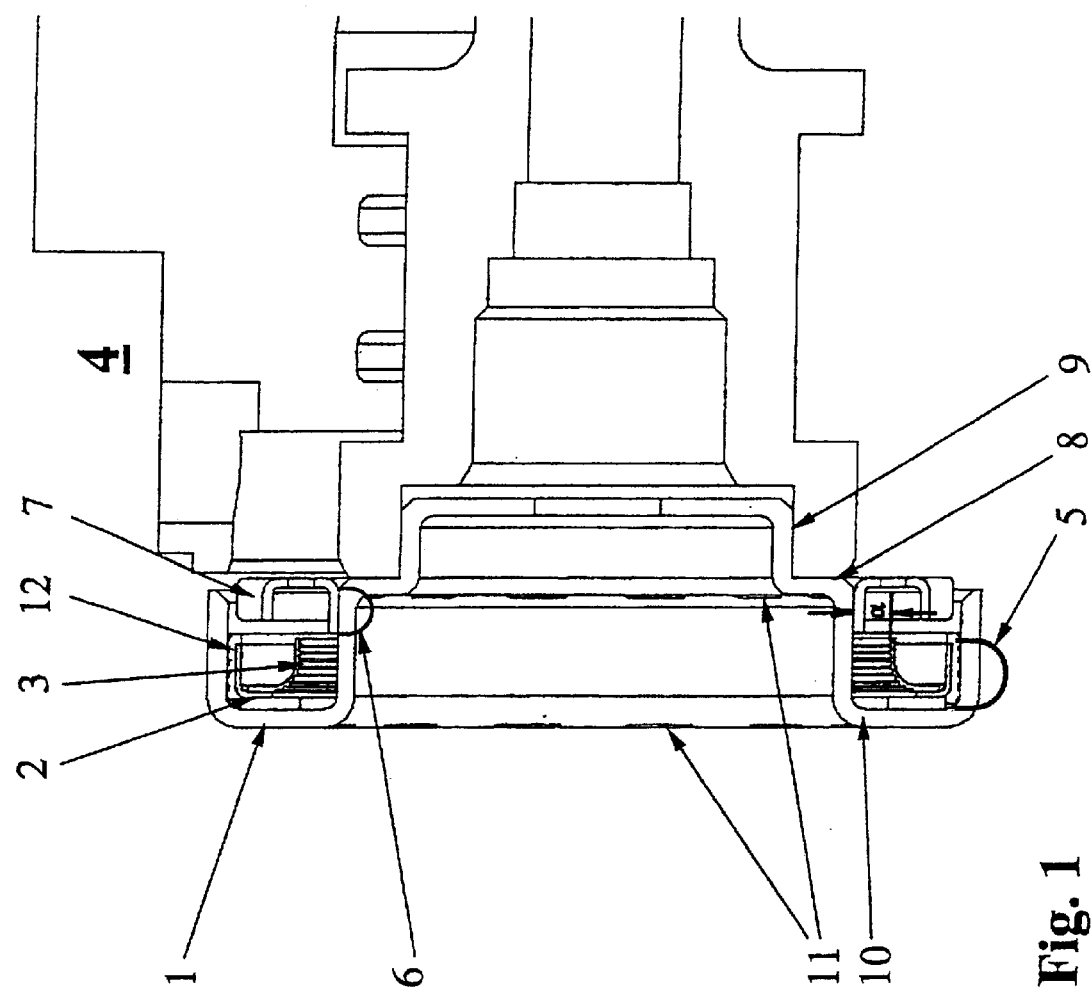

FIG. 1 shows a transport and assembly device 1, generally in the form of a collar made of plastic, equipped with a shaft seal 2 as well as a signal generator wheel 7. During transport, the three components (i.e., the transport and assembly device 1, the shaft seal 2 and the signal generator wheel 7) together form a transport and assembly unit capable of being transported.

The transport and assembly unit formed by the device 1, the shaft seal 2 and the signal generator wheel 7 is adapted to be attached or installed to the end of a camshaft arrangement 4 in the illustrated manner shown in FIG. 1. For this purpose, the transport and assembly device 1 possesses an attachment area that includes, in this case, an axial installation area 8 and a radial installation area 9. The device 1 can thus be relatively exactly or precisely positioned radially to the camshaft arrangement 4 as well as axially to the camshaft arrangement 4. As illustrated in FIG. 1, the axial installation area 8 is formed by a radially inwardly directed component of the device 1 whose outer surface faces in the axial direction to axially position the device 1 relative to the camshaft arrangement 4. The radial installation area 9 is formed by a component of the device 1 extending axially from the axial installation area 8 and whose outer surface faces in the radially outward direction to radially position the device 1 relative to the camshaft arrangement 4.

In addition to the installation areas 8, 9, the device 1 includes a rotationally-symmetrical component 1' having a U-shaped cross-section. The open end of the "U" in the U-shaped component 1' faces in the direction towards the camshaft arrangement 4. The transition area 10 of the "U" forming the U-shaped component 1' contains a plurality of recesses or bores 11 that are evenly distributed across the circumference.

The radially exteriorly positioned cylindrical section of the "U" possesses a first intake area 5 for positioning the shaft seal 2 during transport and/or assembly thereof, while the radially interiorly positioned cylindrical section of the "U" has a second intake area 6 for positioning the signal generator wheel 7 during transport and/or assembly thereof. Both the shaft seal 2 and the signal generator wheel 7 are arranged in the device 1 in such a way that they essentially already are in the position in which they will also be seated relative to each other later on with respect to the camshaft arrangement (i.e., the camshaft or camshaft housing). The shaft seal 2 abuts the first intake area 5 of the device 1 with its static sealing element 12 and can therefore be easily shifted by it. Similarly, the fit between the second intake area 6 and the signal generator wheel 7 is chosen so that an axial shifting of the signal generator wheel 7 from the device 1 is possible without any difficulties. The dynamic seal lip 3 of the shaft seal 2 is positioned in the device 1 at a radial distance "a" to the second intake area 6.

Figure 2:
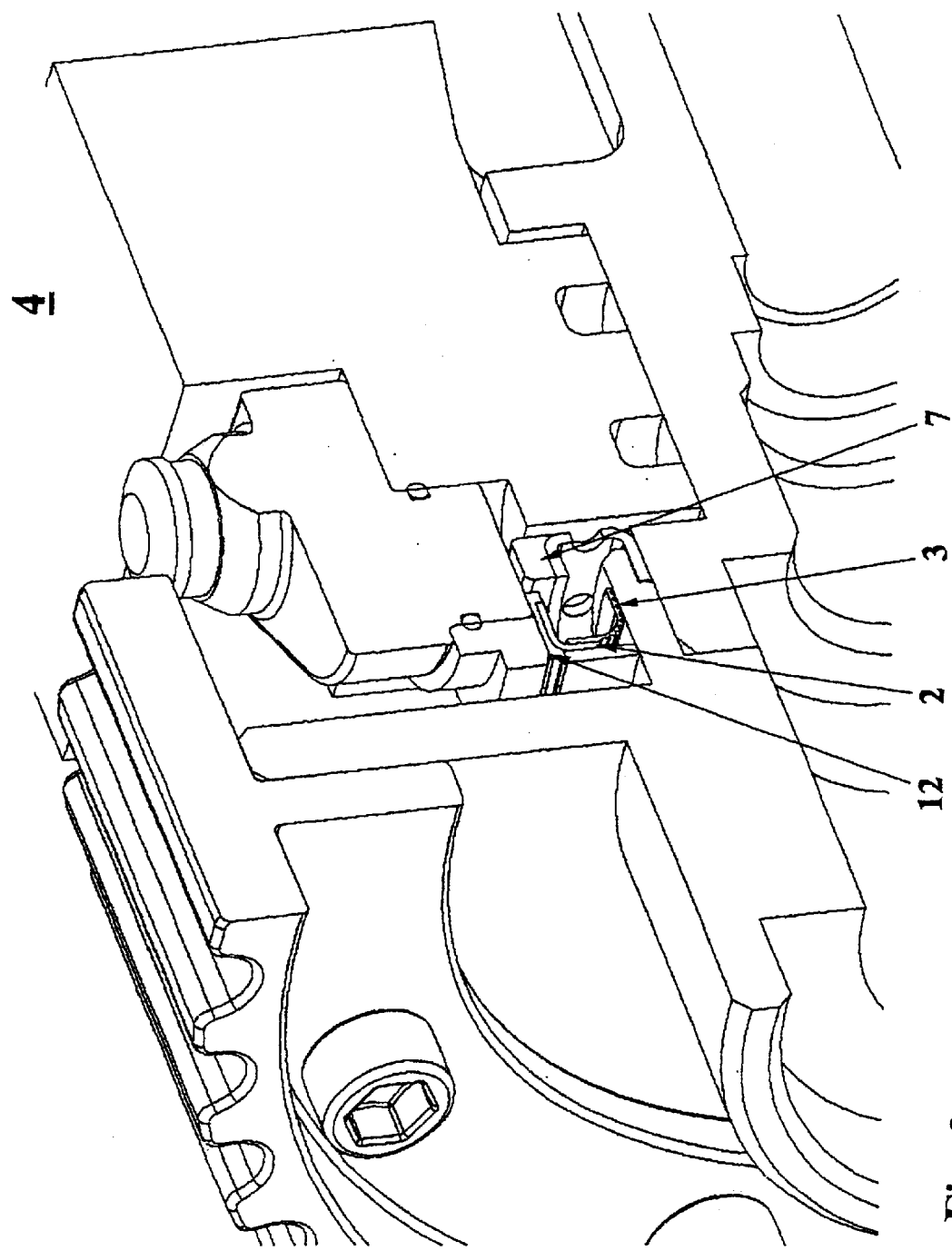
FIG. 2 is a perspective cross-sectional view of the camshaft arrangement in an assembled state.

After the transport and assembly device 1 has been attached or installed to the camshaft arrangement 4 by way of the installation areas 8, 9 in the manner shown in FIG. 1, an assembly, or pressing, tool containing a plurality of fingers is used to engage the recesses or bores 11 in the transition area 10 of the device 1 from the outside. By shifting the fingers toward the right with reference to the FIG. 1 illustration, both the signal generator wheel 7 and the shaft seal 2 can be axially shifted into the camshaft arrangement 4. An axial stroke is performed by the pressing tool in such a way that both assembly components (i.e., the shaft seal and the signal generator wheel) are placed into their respective final positions in the camshaft arrangement 4. The finished camshaft arrangement assembly is illustrated in FIG. 2.

In this way, both the shaft seal 2 and the signal generator wheel 7 can be assembled into the camshaft arrangement 4 in one step, thus producing a significant simplification of the assembly process.

Figure 3:
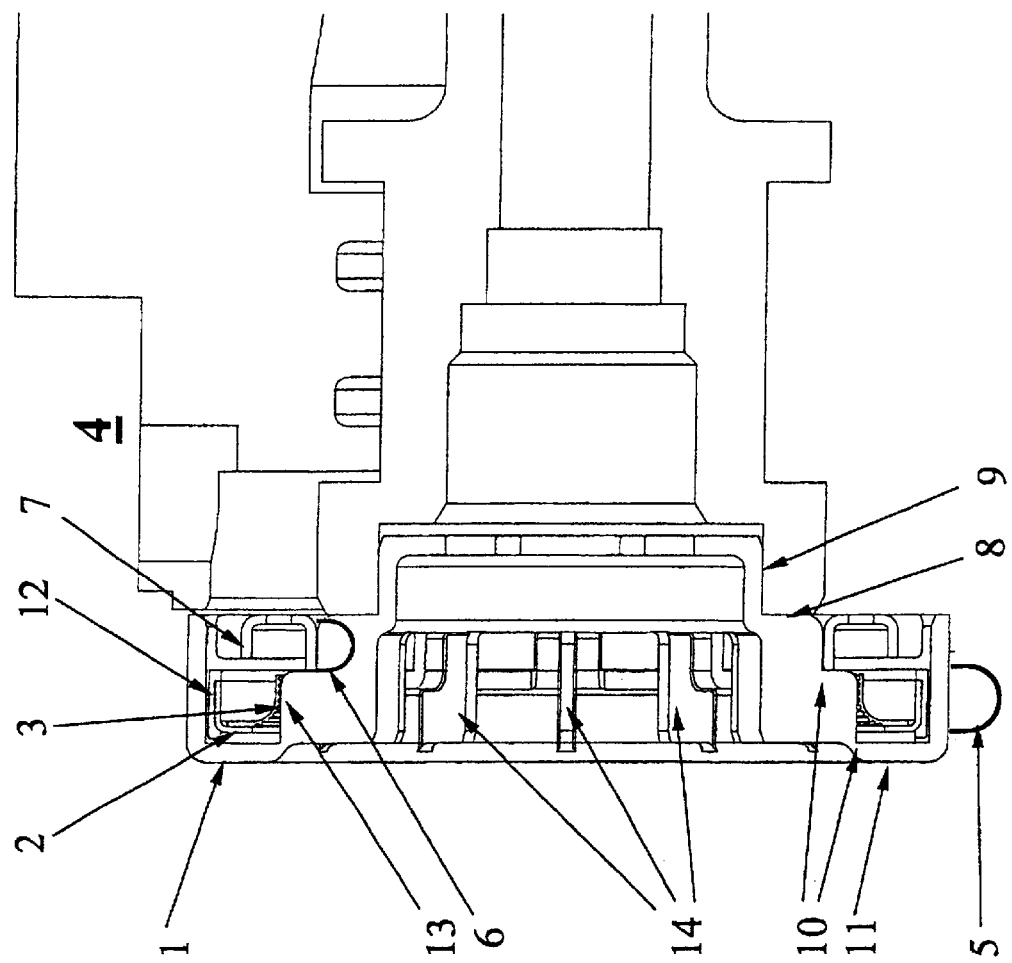
FIG. 3 is a partial cross-sectional view similar to FIG. 1 illustrating an alternative embodiment.

An alternate construction of the transport and assembly device is illustrated in FIG. 3. The FIG. 3 arrangement differs from that shown in FIG. 1 in that in the embodiment shown in FIG. 3, a support area 13 is provided for the seal lip 3 in the first intake area 5. The support area 13 is offset radially inwardly of the first intake area 5. Together with the neighboring second intake area 6, this support area 13 forms the exterior-cylindrical section of the collar for the signal generator wheel 7, whereby a step is provided between the second intake area 6 and the support area 13. This ensures that the seal lip 3 is safely abutted during transport and is protected in order to avoid any damage. Additionally, the support area 13 also produces a protective effect during the assembly procedure.

FIG. 3 also illustrates that the transport and assembly device 1 is also equipped with a plurality of axially extending reinforcement ribs 14 that substantially increase the stability of the device. This can be significant from the standpoint of protecting against deformations due to reaction forces during assembly. The reinforcement ribs 14 are designed so that a stable stacking of a plurality of the transport and assembly devices is possible. Additionally, the assembly device may be designed in such a way that it surrounds the seal or the generator wheel in an environment protected from dust and dirt in its stacked condition of several devices on top of each other.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A transport and assembly unit for assembling components into a camshaft arrangement for an internal combustion engine comprising:

a transport and assembly device provided with an attachment area for attaching the transport and assembly device to a camshaft arrangement during assembly;

a shaft seal positioned in the transport and assembly device;

a signal generator wheel positioned in the transport and assembly device;

a first intake area provided on the transport and assembly device for positioning of the shaft seal; and a second intake area provided on the transport and assembly device for positioning of the signal generator wheel.

2. The transport and assembly unit according to claim 1, wherein the transport and assembly device is formed as a collar, with the first intake area being located at an exterior cylindrical section of the collar.

3. Transport and assembly unit according to claim 2, wherein the transport and assembly device is formed as a collar, with the second intake area being located at an interior cylindrical section of the collar.

4. The transport and assembly unit according to claim 3, wherein the first intake area and the second intake area are offset from one another in an axial direction.

5. The transport and assembly unit according to claim 4, wherein the first intake area and the second intake area are provided on a U-shaped component of the collar.

6. The transport and assembly unit according to claim 5, wherein the U-shaped component of the collar includes a transition area having a plurality of spaced apart recesses.

7. The transport and assembly unit according to claim 6, wherein the attachment area includes an axial installation area for axially positioning the transport and assembly device with respect to the camshaft arrangement and a radial installation area for radially positioning the transport and assembly device with respect to the camshaft arrangement.

8. The transport and assembly unit according to claim 1, wherein the shaft seal possesses a static sealing element with which the shaft seal is abutted to the first intake area.

9. The transport and assembly unit according to claim 1, wherein the shaft seal includes a radially inwardly directed seal lip.

10. The transport and assembly unit according to claim 9, wherein the seal lip is spaced a radial distance from the second intake area.

11. The transport and assembly unit according to claim 9, including a support area for the seal lip that is offset radially inwardly of the first intake area.

12. The transport and assembly unit according to claim 11, wherein an exterior cylindrical section of the second intake area and the support area are arranged next to one another to form a stepped arrangement.

13. The transport and assembly unit according to claim 1, wherein the transport and assembly device includes axially extending reinforcement ribs.

14. The transport and assembly unit according to claim 1, wherein the transport and assembly device is made of plastic.

15. A method of assembling a shaft seal and a signal generator wheel into a camshaft arrangement for an internal combustion engine comprising:

installing an assembly unit to the camshaft arrangement, the assembly unit including a collar with an open end, a shaft seal positioned in the collar and a signal generator wheel positioned in the collar;

moving the shaft seal and the signal generator wheel at the same time from the collar into a camshaft arrangement for an internal combustion engine by way of the open end of the collar to assemble the shaft seal and the signal generator wheel to the camshaft arrangement.

16. The method according to claim 15, wherein the collar includes a first intake area for intake of the shaft seal and a second intake area for intake of the signal generator wheel.

17. The method according to claim 15, wherein the shaft seal and the signal generator wheel are moved from the collar into the camshaft arrangement by accessing the shaft seal and the signal generator wheel through a plurality of holes provided in the collar.

18. The method according to claim 15, wherein the assembly unit is installed to the camshaft arrangement by way of an axial installation surface provided on the collar to axially locate the assembly unit with respect to the camshaft arrangement.

19. The method according to claim 18, wherein the assembly unit is installed to the camshaft arrangement by way of a radial installation surface provided on the collar to radially locate the assembly unit with respect to the camshaft arrangement.

20. The method according to claim 15, wherein the assembly unit is installed to the camshaft arrangement by way of a radial installation surface provided on the collar to radially locate the assembly unit with respect to the camshaft arrangement.

* * * * *